(No Model.)

T. R. MORGAN, Jr.
METAL WORKING MACHINE.

No. 513,812.

2 Sheets—Sheet 1.

Patented Jan. 30, 1894.

Witnesses:
Jas. E. Hutchinson.
G. F. Downing.

Inventor.
Thomas R. Morgan Jr
By H. A. Seymour
Attorney (No Model.) 2 Sheets—Sheet 2.

T. R. MORGAN, Jr.
METAL WORKING MACHINE.

No. 513,812. Patented Jan. 30, 1894.

Witnesses:
Jas. E. Hutchinson.
G. F. Downing.

Inventor.
Thomas R. Morgan Jr.
By H. A. Seymour
Attorney.

UNITED STATES PATENT OFFICE.

THOMAS R. MORGAN, JR., OF ALLIANCE, OHIO, ASSIGNOR OF THREE-FOURTHS TO THOMAS R. MORGAN, SR., WILLIAM H. MORGAN, AND JOHN R. MORGAN, OF SAME PLACE.

METAL-WORKING MACHINE.

SPECIFICATION forming part of Letters Patent No. 513,812, dated January 30, 1894.

Application filed January 14, 1893. Serial No. 458,416. (No model.)

*To all whom it may concern:*

Be it known that I, THOMAS R. MORGAN, Jr., of Alliance, in the county of Stark and State of Ohio, have invented certain new and useful Improvements in Metal-Working Machines; and I do hereby declare the following to be a full, clear, and exact description of the invention, such as will enable others skilled in the art to which it appertains to make and use the same.

My invention relates to improved metal working machines, and more particularly to combined punching and shearing machines.

In the machines ordinarily employed the main actuating shaft or the shaft having eccentric thereon is made in two parts, arranged in line, each part carrying clutch mechanism for coupling up to the driven wheel. The inner ends of the two shafts rest in a plane or planes passing vertically through the driven wheel, and as they wear unevenly at their ends, they not only have an irregular or wabbling motion themselves but as they form bearings for the driven wheel they also cause the latter to have an irregular motion.

The object of my invention is to overcome this objection, and it consists in the parts and combinations of parts as will be more fully described and pointed out in the claims.

Figure 1:
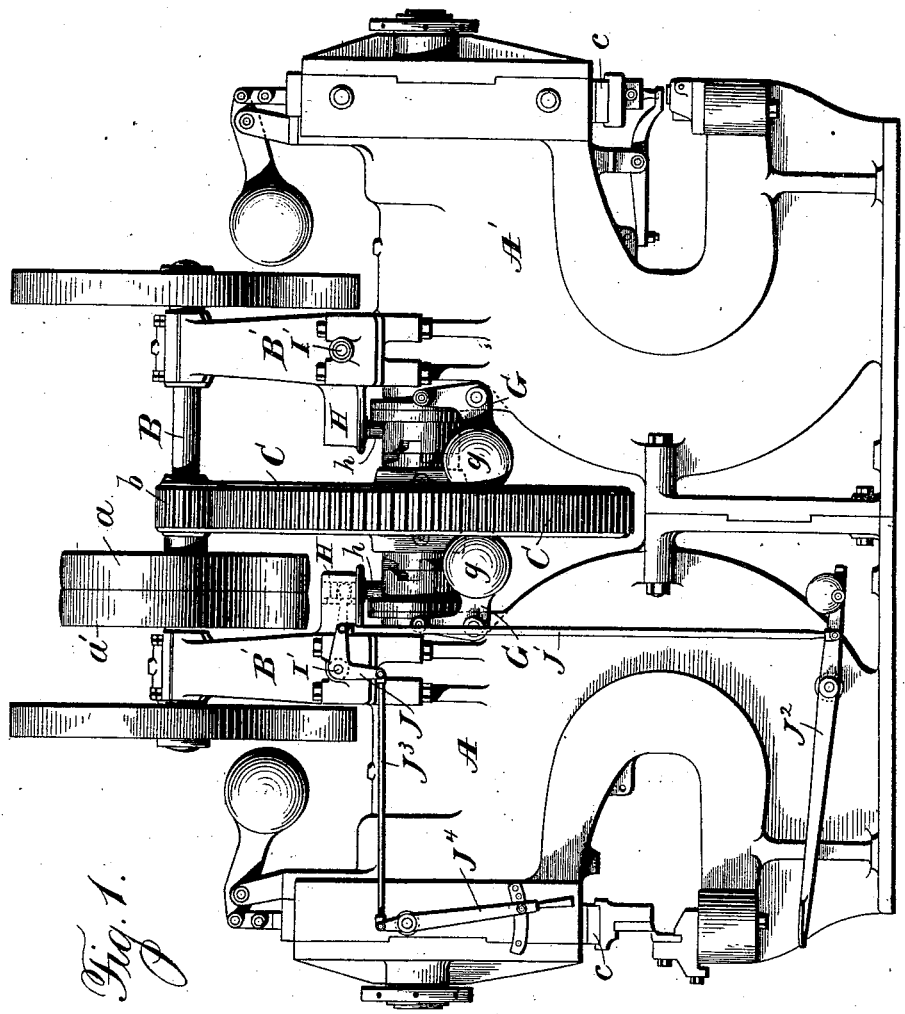
Figure 2:
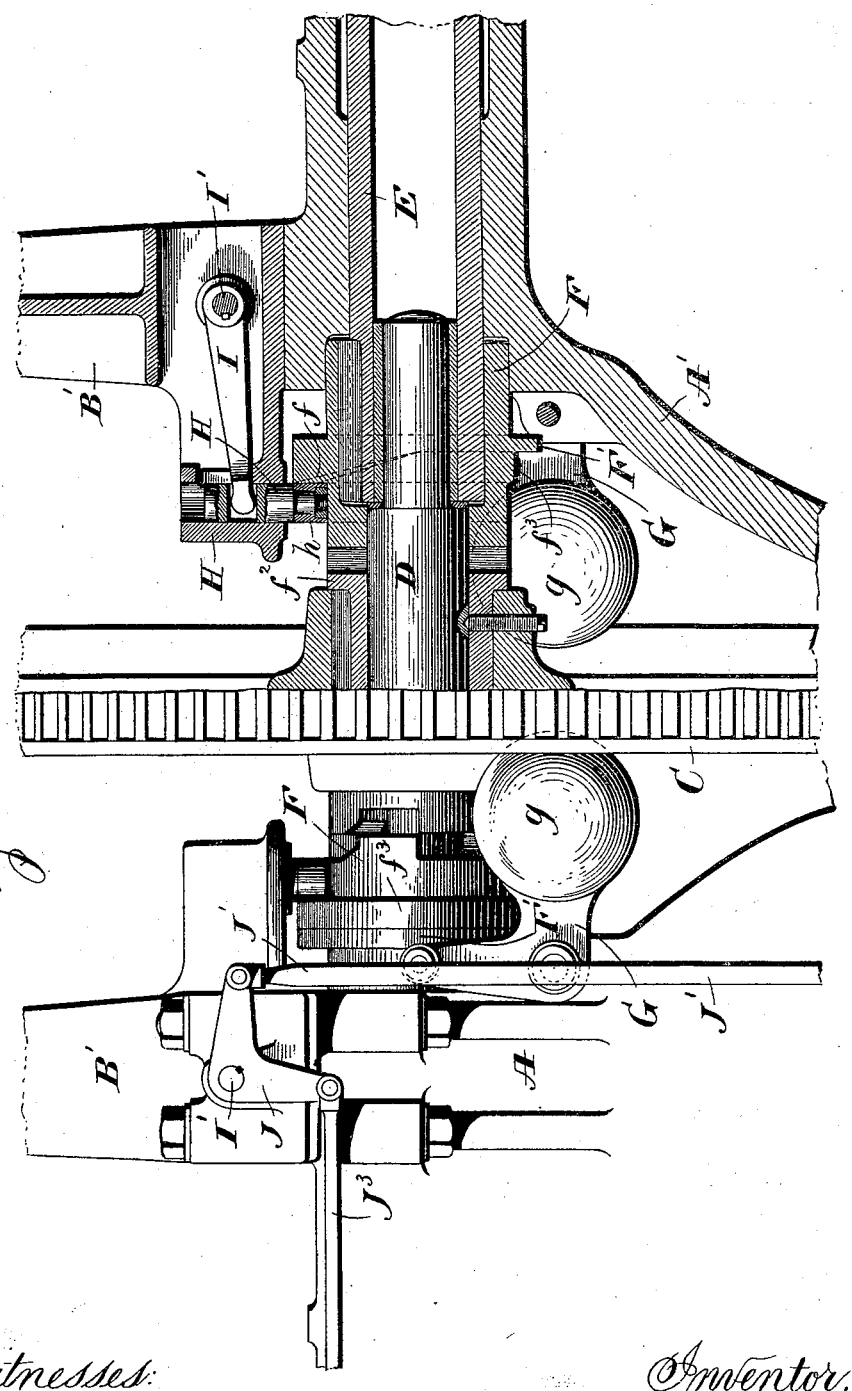

In the accompanying drawings, Figure 1 is a view in side elevation of a machine embodying my invention, and Fig. 2 is a view partly in elevation and partly in section of the main shaft showing the clutches and the devices for actuating them.

A and A' represent two machines placed back to back and securely bolted together, the machine A in the present instance being shown with shears, and the machine A' with a punch. The tools used however are immaterial as my invention relates solely to the devices for imparting motion to the tools and the devices for automatically shifting the clutches.

B is a shaft mounted in bearings B' carried by the machine A and A', and carrying a fast pulley $a$ and a loose pulley $a'$ and the small toothed wheel $b$ which latter meshes with the large wheel C keyed to shaft D. The shaft D is somewhat reduced at its opposite ends, and the said reduced ends are mounted in the hollow shafts E one of which is shown in Fig. 2. One shaft E is mounted in each machine A A' at or near the top thereof, as clearly shown in both figures of the drawings, and actuates the plunger $c$ by means of cranks, eccentric or any equivalent means, so as to impart to the latter the necessary downward movement. The shaft D with the driven wheel C thereon is free to revolve in its bearings in shafts E, and hence when the latter are not locked to shaft D by the clutches to be hereinafter described, shaft D is free to revolve without imparting movement to either shaft E.

The clutches are located on opposite sides of wheel C and operate to lock their respective shafts E to shaft D. Each clutch F is provided with teeth for engaging correspondingly shaped teeth formed on the hub of wheel C or on a sleeve $f^2$ secured to shaft D as shown and each is also provided with a collar F having a cam shaped part $f$ clearly shown in Fig. 2. The cam shaped parts $f$ are so located relatively to the crank, eccentrics or other device on shafts E for actuating the plungers $c$ that when the cam shaped portions $f$ of the collars F reach the position shown at the right side of Fig. 2, the plungers are elevated.

The clutches F are keyed to shafts E, so as to rotate therewith but are free to slide longitudinally to engage and be disengaged from the teeth on sleeve $f^2$ or on the hub of wheel C, and are moved longitudinally in one direction by the bell crank levers G pivoted at their elbows and provided at one end with yokes or pins for engaging the rear or outer faces of the collars F and at their other ends with weights $g$, the tendency of which is to constantly force the clutches F toward the teeth carried by shaft D.

Located in a position immediately over the clutches F are the vertical bearings or boxes H in each of which is slidingly mounted the blocks or abutments H'. These blocks are preferably cylindrical in shape and are provided at their lower ends with a wearing face $h$ which if desired can rotate when in contact with the collars F' of clutches F. Each block H is slotted as shown in Fig. 2 for the reception of one end of a lever I which latter is secured to the rock shaft I. Each rock shaft carries a bell crank lever J to one end of which is secured a pitman J', the latter being secured at its lower end to the treadle $J^2$. To the opposite end of the bell crank lever J is secured the rod $J^3$, which latter is connected at its opposite end to the hand lever $J^4$.

From the foregoing it will be seen that by pressing down on treadle $J^2$, or moving the lower end of hand lever $J^4$ outwardly the block H is elevated and retained in such elevated position until the pressure or power on the treadle or lever is removed. While the blocks H are elevated the weights G hold the clutches F in engagement with the teeth on shaft D, and so long as the clutches are locked to shaft D both shafts E are revolved. To stop either shaft, E, the block H is lowered to the position shown in Fig. 2, or in other words, to a position between the collar F' and wheel C. If the cam shaped section $f$ of the collar should be uppermost the block would rest on the top thereof until the clutch makes a partial revolution or in other words until the cam shaped section $f$ thereof has moved wholly from under the block; the block would then descend on incline $f^3$ and as the cam surface $f$ again approached the block the latter would be in front of the cam, and the contact between the latter and the block would cause the clutch to move outwardly thus disengaging the teeth thereof from the teeth on the sleeve $f^2$ or hub of wheel C as the case may be, and stopping the revolution of the shaft and as the crank, eccentric or other device on shaft is placed relatively to the cam surface $f$ of clutch F, so as to have plunger $c$ elevated when the cam surface $f$ is in engagement with the block H, it follows that when the clutch is moved outwardly to release shaft E, the tool carried by plunger will be in its elevated position.

To clutch in shafts E it is simply necessary to elevate blocks H, and so long as they are held in elevated position, the shafts D and E will be rotated together. The shaft D could be extended to pass through shafts E, and the clutches located at the outer ends, but it is more convenient to arrange all the actuating mechanism within the space between the two machines as shown, as it not only economizes space and saves material, but the wheels and clutches are out of the way and not in a position to interfere with the operators or with the free handling of the material operated upon. By employing three shafts, one carrying the driven wheel and supported in the ends of the other shafts, the wear on the outer faces of the inner ends of the eccentric shaft is to a large extent avoided and the irregular motion of the driven wheel caused by such wear overcome.

Having fully described my invention, what I claim as new, and desire to secure by Letters Patent, is—

1. The combination with a driving shaft and a driven shaft in line therewith, one of said shafts having a hollow end for the reception of the adjacent end of the other shaft, of a clutch for locking the two shafts together, the said clutch having a cam shaped collar, and a movable block adapted when in its depressed position to engage the clutch to release the driven shaft.

2. The combination of two machines arranged back to back, a driven shaft for each machine, a driving shaft located between and separating the ends of the driven shafts, and a clutch for connecting each driven shaft to the driving shaft, substantially as set forth.

3. The combination with a driving shaft and a driven shaft in line therewith the latter having a hollow end for the reception of the adjacent end of the driving shaft, of a clutch carried by the driven shaft and having a cam shaped collar thereon and a movable block for engaging said cam shaped collar.

4. The combination with a driving shaft, a driven shaft having a hollow end for the reception of one end of the driving shaft and a plunger the latter being actuated by the driven shaft, of a clutch for locking the two shafts together a collar on said clutch, the collar having a cam shaped section thereon and a movable block adapted to engage said collar and the cam shaped section and move the clutch longitudinally, the said cam shaped section being so located relative to the driven shaft that the plunger actuated by the latter is in its elevated position by the time the clutch has released said driven shaft.

5. The combination with two machines arranged back to back, two driven shafts for actuating the movable parts of said machines, and a single driving shaft in a plane with and intermediate the inner ends of the driven shafts, and supported at its ends in sockets or recesses in said driven shafts, of two clutches, one for each driven shaft, and means actuating said clutches, substantially as set forth.

6. The combination with two machines arranged back to back, two driven shafts for actuating the movable parts of said machines, and a single driving shaft in a plane with and intermediate the ends of the driven shafts, and supported at its ends in sockets or recesses in said driven shafts, of two clutches each having a cam shaped collar, and two movable blocks each of the latter adapted to engage the collar of its respective clutch, substantially as set forth.

7. The combination with a driving shaft and a driven shaft in line therewith, one of said shafts having a hollow end for the reception of the adjacent end of the other, of a clutch for locking the two shafts together the said clutch having a cam shaped collar and a movable block for engaging said cam shaped collar.

In testimony whereof I have signed this specification in the presence of two subscribing witnesses.

THOMAS R. MORGAN, JR.

Witnesses:
F. E. DUSSEL,
H. W. HARRIS.